(12) United States Patent
Hölscher et al.

(10) Patent No.: US 8,250,668 B2
(45) Date of Patent: Aug. 21, 2012

(54) CANTILEVER WITH PADDLE FOR OPERATION IN DUAL-FREQUENCY MODE

(75) Inventors: Hendrik Hölscher, Weingarten (DE); Santiago De Jesus Solares, Bowie, MD (US)

(73) Assignees: Forschungszentrum Karlsruhe GmbH, Karlsruhe (DE); University of Maryland, College Park, MD (US)

( * ) Notice: Subject to any disclaimer, the term of this patent is extended or adjusted under 35 U.S.C. 154(b) by 314 days.

(21) Appl. No.: 12/586,172

(22) Filed: Sep. 16, 2009

(65) Prior Publication Data

US 2011/0067150 A1    Mar. 17, 2011

(51) Int. Cl.
*G01Q 60/24* (2010.01)

(52) U.S. Cl. .............. 850/33; 850/40; 850/6; 850/5; 73/105

(58) Field of Classification Search ............. 850/33, 850/40, 6, 5; 73/105
See application file for complete search history.

(56) References Cited

U.S. PATENT DOCUMENTS

2006/0005614 A1*  1/2006  Sahin et al. ............. 73/105
2007/0268016 A1* 11/2007  Chi et al. ............... 324/248

* cited by examiner

*Primary Examiner* — Jack Berman
*Assistant Examiner* — Meenakshi Sahu
(74) *Attorney, Agent, or Firm* — Lucas & Mercanti, LLP; Klaus P. Stoffel

(57) ABSTRACT

A microcantilever system comprising a paddle, its use and a method of simultaneously acquiring the topography and measuring the tip-sample interactions of a sample with it.

7 Claims, 1 Drawing Sheet low-frequency response
(imaging)

high-frequency response
(spectroscopy)

CANTILEVER WITH PADDLE FOR OPERATION IN DUAL-FREQUENCY MODE

This application claims priority to U.S. provisional application 61/096,943 filed on Sep. 15, 2008.

The entire disclosure of the prior application is considered to be part of the disclosure of the instant application and is hereby incorporated by reference.

Any of the documents cited herein are incorporated by reference in their entirety.

The instant invention concerns specific microcantilevers and their use in atomic force microscopy.

BACKGROUND OF THE INVENTION

The atomic force microscope (AFM) has become a standard instrument in nano-analysis with regards to the rapid and uncomplicated technical exploration of surfaces at the micro- and nanometre scales. During characterization, a probe mounted at the end of a cantilever beam is generally placed in direct contact with the sample, such that the surface topography is obtained through a raster scan while maintaining a constant tip-sample force. An important upgrade to this basic process is the so-called dynamic AFM mode, whereby the cantilever oscillates near the surface while changes in the oscillation amplitude are monitored while also recording the relative position of the tip and the sample. If one uses the amplitude change as the control signal, it is possible to measure the sample topography with high vertical and lateral resolution. This principle works in air, liquid and vacuum environments. Other techniques have also been developed to obtain information about the tip-sample interactions. For example, the resonant frequency of the cantilever can be measured as a function of the tip-sample separation, from which the tip-sample interaction force can be obtained (Hölscher et al., Phys. Rev. B 61, 12678 (2000)). However, these additional measurements can only be performed through a subsequent characterization after scanning of the surface topography.

The conventional techniques that are already established do not allow the simultaneous analysis of the tip-sample interactions during imaging of the surface.

The approach of Stark et al. [PNAS 99, 8473 (2002)] and Legleiter et al. [PNAS 103, 4813 (2006)] can in principle solve the problem through an elaborate analysis of the cantilever oscillation. However this is quite complex to perform and the noise is high.

The approach of Sahin et al. [Nature Nanotechnology 2, 507 (2007)] solves the problem through the use of special cantilevers. However these have the disadvantage of a coupling between the lateral and normal motion of the cantilever. Besides, the tip moves laterally in an undefined pattern and the lateral frequency of the tip is only slightly higher than the normal motion (typically below 20:1). The demands on the system electronics are so high that one can only use the specifically-designed, original electronics of the manufacturer Veeco Instruments, who have exclusively commercialized this technique under the name Harmonix (WO2006/014542 A1).

The manufacturing of miniature paddles is described in Evoy et al. [J. Appl. Phys. 86, 6072 (1999)] and Boonliang et al. [J. Micromech. Microeng. 18, 015021 (2008)]), the use of such paddles in cantilevers for AFM is not described.

OBJECT OF THE INVENTION

It was an object of the instant invention to overcome the deficiencies of the prior art. It was an object of the instant invention to provide a way to do both imaging and spectroscopy with AFM at the same time. It was an object of the instant invention to provide novel cantilevers suitable for AFM that can be used to overcome the problems of the prior art.

SUMMARY OF THE INVENTION

The objects of the instant invention have been solved by a specifically designed cantilever/cantilever system and its use in atomic force microscopy.

DETAILED DESCRIPTION

In the instant invention the terms "cantilever", "cantilever system", "microcantilever" and "microcantilever system" are used synonymously.

Through modification of a standard AFM cantilever with a FIB (focused ion beam) or through direct micromachining, the instant invention's cantilevers that have a paddle attached at the free end were made (sometimes referred to as "paddle cantilevers" in the following).

The paddles of the instant invention's cantilevers can be designed to oscillate at frequencies that are significantly higher (1-1000 MHz) than the fundamental frequency of the cantilever (a few tens of kHz). In the context of the instant invention it was found that through proper design it is possible to select the force constant, oscillation amplitude (given a set of AFM operation parameters) and frequency of the paddle, such that a good signal-to-noise relation can be achieved.

The design according to the instant invention ensures that the oscillation of the cantilever, which is used to acquire the sample topography, is nearly completely decoupled from the oscillation of the paddle, which is used to detect the tip-sample interactions.

The oscillation of the paddle is brought about either by intermittent contact between the probe and the sample, or by AFM excitation schemes. This way it was found possible to obtain complete decoupling of the imaging and spectroscopy, and was found possible to simultaneously acquire the topography and measure the tip-sample interactions by the instant invention.

The instant invention provides a novel atomic force microscopy (AFM) microcantilever/microcantilever system of specific design, namely one containing a paddle built or cut into the distal end of the microcantilever.

The microcantilever itself can be of varying shape, including shapes as rectangular, V-shaped, etc.

The paddle can also be of varying, not-necessarily symmetric shape including shapes as square, rectangular, oval-shaped, etc.

The paddle has a tip or probe attached to it, which is suitable for AFM characterization, and which is caused to oscillate towards and away from the sample surface in the nearly normal direction when the paddle vibrates.

In one embodiment of the instant invention, the cantilever itself is of rectangular shape and the paddle is of square shape, the cantilever and the paddle being connected by small rods/supporting beams.

The paddle can be located symmetrically centred at the distal end of the cantilever.

In another embodiment of the instant invention it is possible, that the paddle is located on one side of the distal end of the cantilever. It is also possible in another embodiment of the instant invention, that the distal end of the cantilever itself has an extension to one side or extensions to both sides (making it L-shaped or T-shaped) and the paddle is located in either one or both extensions of the cantilever. The cantilever can also be asymmetric in various ways, including curved.

In an embodiment of the instant invention, the supporting beams that connect the paddle with the cantilever itself, can be located anywhere on the sides of the paddle, including somewhere in the middle of the paddle-sides or on the one or other end of the paddle-sides (making it look as if the paddle was a flag, either extending outward from the cantilever or inward).

The paddle's vibration does not perturb the flexural vibration of the cantilever, and has a fundamental resonance frequency between the cantilever's fundamental resonance frequency and hundreds of megahertz, such that this frequency can be designed into the system through selection of the appropriate paddle and supporting beam dimensions.

In one embodiment, the cantilever itself can for example have a length of 50-500 µm, a width of 10-100 µm and a thickness of 1-10 µm.

In one embodiment, the dimensions of the paddle depend on the cantilever size, preferably it can have a length of 10-100 µm, a width of 10-100 µm and a thickness of 1-10 µm.

One example of a cantilever produced according to the instant invention had dimensions of 225 µm by 38 µm by 7 µm with trapezoidal cross section, having a force constant of 48 N/m and a resonance frequency of 190 kHz with a paddle having dimensions of 10 µm by 10 µm.

Other paddles produced according to the instant invention had dimensions of 25 µm by 16 µm, 37 µm by 33 µm, 19 µm by 12 µm and 60 µm by 36 µm, with cantilevers of appropriate dimensions.

The tip response of the instant invention's cantilever has the form of a high high-frequency response curve (the "spectroscopy curve") superimposed over a low-frequency response curve (the "imaging curve").

The cantilever itself oscillates with a low frequency, which can be used for imaging (thus resulting in the "imaging curve").

The tip/the paddle oscillates with a high frequency and small amplitude, which can be used for force spectroscopy (thus resulting in the "spectroscopy curve").

The paddle may be machined on existing standard commercial cantilevers through techniques such as focused-ion-beam (FIB) etching. Alternatively, the ensemble can be manufactured by using standard micromachining methods.

The material of the instant invention's cantilever can be any material capable of producing standard AFM microcantilevers.

Examples for materials that can be used according to the instant invention include silicon and silicon nitride ($Si_3N_4$).

The oscillation of the paddle is brought about either by intermittent contact between the probe and the sample during flexural vibration of the cantilever, or by conventional AFM excitation schemes which include piezoelectric, magnetic, excitation schemes governed by the AFM instrument's controls systems.

The tracking of the vibration of the paddle and of the flexural vibration of the cantilever can
- in one preferred embodiment be performed through the laser-beam method, whereby a laser beam is reflected on the distal end of the cantilever and the paddle, and onto a photodetector, or
- in another preferred embodiment be performed through the incorporation of either piezoelectric sensors or sensors based on tunnel magnetoresistance (TMR), whereby these sensors are placed at the base of the cantilever and on or in the proximity of the supporting structural members of the paddle.

In a preferred embodiment of the instant invention, the flexural vibration of the cantilever is completely decoupled from the vibration of the paddle such that these two modes of vibration do not interfere with one another.

The instant invention also encompasses the use of the inventive microcantilever system for AFM characterization in vacuum, air and liquids, whereby
(1) the sample topography is obtained by controlling the cantilever flexural vibration using any of the standard AFM imaging modes, such as but not limited to amplitude-modulation, frequency-modulation and contact-mode, including all their variants, preferably amplitude-modulation or frequency-modulation and
(2) the tip sample interaction force curve is calculated through analysis of the vibration trajectory of the paddle at the end of the cantilever, with or without actively controlled vibration.

The latter analysis can be carried out preferably either through Fourier methods applied to the paddle deflection signal or through direct evaluation of this signal or its instantaneous vibration frequency as a function of the tip-sample distance.

The evaluation of the signal obtained from the oscillating cantilever end (paddle) is similar to that of existing techniques.

According to the instant invention two ways are preferred:
1. Evaluation of the signal through Fourier analysis corresponding to the approaches of Stark [PNAS 99, 8473 (2002)], which rests upon the analysis of the higher-order oscillation of a conventional cantilever, and Sahin et al. [Nature Nanotechnology 2, 507 (2007)], which uses special cantilevers and is based on the de-coupling of the oscillation of the tip into a normal and a lateral oscillation of the cantilever.
2. Evaluation of the signal as a function of the actual tip-sample distance corresponding to the evaluation proposed by Solares and Chawla [Meas. Sci. Technol. 19, 055502 (2008)]. As presented, this approach considered only a very simple approximation, whereby the frequency shift is directly proportional to the tip-sample force gradient. This approximation is only valid for very small amplitudes [Hölscher et al., Appl. Surf. Sci. 140, 344 (1999)] and can be significantly improved [Hölscher et al., Phys. Rev. B 61, 12678 (2000)].

In a preferred embodiment, measurement of both oscillations with integrated sensors based on the piezo- or tunnel magnetoresistance (TMR)-effect is done, thus eliminating the need for the usual adjustment of the laser beam on the end of the cantilever (generally used to detect the oscillations).

Significant advantages of the instant invention are:
- it is possible to use standard cantilevers that can be used in conventional microscopes as starting materials for the machining of the instant invention's cantilevers containing a paddle,
- a complete decoupling of both oscillations is achieved,
- very high frequency of the paddle in comparison with the cantilever frequency,
- simultaneous topographical and spectroscopic characterization is possible.

The method of using a paddle inserted into a cantilever is completely new and has not been used. With this technique it is possible to use conventional microscopes already in existence (e.g., Veeco, Asylum Research, Park or JPK Instruments).

The instant invention's novel cantilever can be used for
(I) atomic force microscopy characterization in vacuum, air and liquids, whereby (1) the sample topography is obtained by controlling the cantilever flexural vibration using any of the standard atomic force microscopy imaging modes, and
(2) the tip sample interaction force curve is calculated through analysis of the vibration trajectory of the paddle at the end of the cantilever, with or without actively controlled vibration (II) nano-analysis, especially in AFM,
(III) replacing standard cantilevers in existing microscopes, or
(IV) simultaneously acquiring the topography and measuring the tip-sample interactions of a sample.

The various embodiments of the instant invention, including those of the dependent claims, can be combined with each other in any desired manner.

DESCRIPTION OF THE FIGURES

The drawing figures are not necessarily to scale. Certain features of the invention may be shown exaggerated in scale or in somewhat schematic form and some details of conventional elements may not be shown in the interest of clarity and conciseness.

The drawing figures are not to be misconstrued as limiting the instant invention to these embodiments, they are only examples used for illustration.

Here, the cantilever 1 is of rectangular shape and the paddle 2 is of square shape having a tip or probe 3 on its underside, the cantilever 1 and the paddle 2 being connected by small rods/supporting beams 4.

Figure 1A:
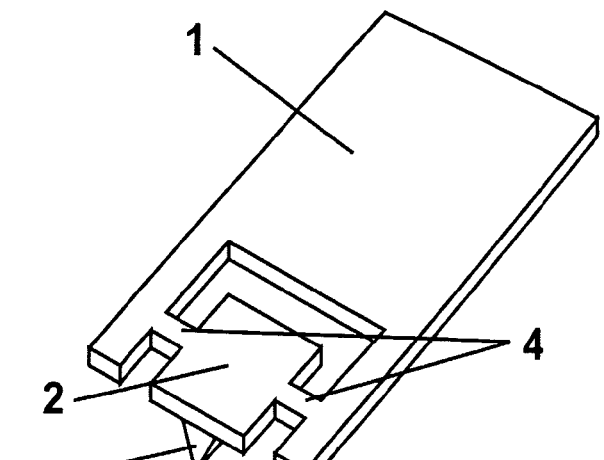
FIG. 1 shows two exemplary embodiments of the instant invention's cantilever systems.
Figure 1B:
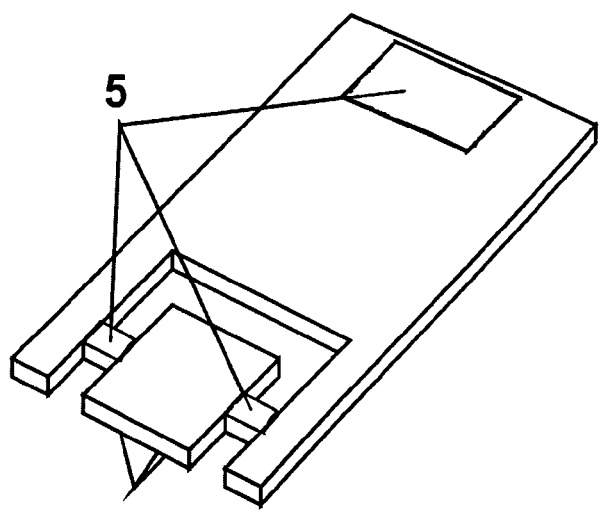

In FIGS. 1a and 1b the paddle 2 is located symmetrically centred at the distal end of the cantilever 1, the supporting beams 4 that connect the paddle 2 with the cantilever 1, are shown in FIGS. 1a and 1b in the middle of the paddle-sides.

The only difference between FIG. 1a and FIG. 1b is that in FIG. 1b three piezoelectric sensors or sensors based on tunnel magnetoresistance (TMR) 5 are shown whereby these sensors 5 are placed at the base of the cantilever 1 and on the supporting structural members 4 of the paddle 2. For clarity's sake in FIG. 1b the features already shown in FIG. 1a are not denominated by the respective numbers.

Figure 2:
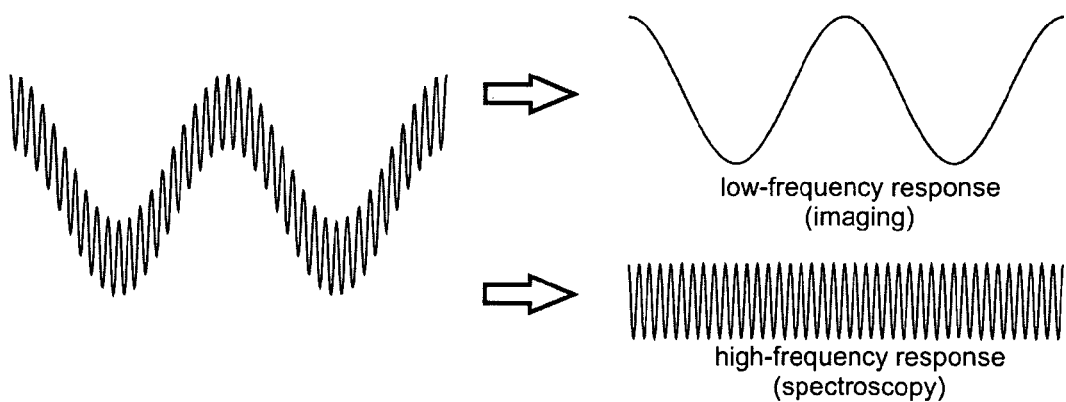

FIG. 2 shows that the tip response of the instant invention's cantilever has the form of a high high-frequency response curve (the "spectroscopy curve") superimposed over a low-frequency response curve (the "imaging curve").

In the figures the following numbers are used:
1 cantilever
2 paddle
3 tip or probe
4 connecting rods/supporting beams
5 piezoelectric or TMR sensors

The invention claimed is:

1. An atomic force microscopy microcantilever system (1) of varying shape containing a paddle (2) of varying, not-necessarily symmetric shape built or cut into its distal end, wherein the paddle (2) has a tip or probe (3) attached to it, wherein either piezoelectric sensors (5) or sensors based on tunnel magnetoresistance are placed at the base of the cantilever (1) and on or in the proximity of the supporting structural members (4) of the paddle (1).

2. The microcantilever system according to claim 1, wherein the cantilever is fabricated of any material capable of producing standard atomic force microscopy microcantilevers.

3. The microcantilever system according to claim 1, wherein the flexural vibration of the cantilever is decoupled from the vibration of the paddle such that these two modes of vibration do not interfere with one another.

4. A method of simultaneously acquiring the topography and measuring the tip-sample interactions of a sample by using the microcantilever system according to claim 1.

5. The method of claim 4, wherein an oscillation of the paddle is brought about either by intermittent contact between the probe and the sample during flexural vibration of the cantilever, or by conventional atomic force microscopy excitation schemes governed by the atomic force microscopy instrument's controls systems.

6. A method of tracking of the vibration of the paddle and of the flexural vibration of the cantilever according to claim 1 through the incorporation of either piezoelectric sensors or sensors based on tunnel magnetoresistance.

7. The use of the microcantilever system according to claim 1 for
(I) atomic force microscopy characterization in vacuum, air and liquids, whereby
(1) the sample topography is obtained by controlling the cantilever flexural vibration using any of the standard atomic force microscopy imaging modes, and
(2) the tip sample interaction force curve is calculated through analysis of the vibration trajectory of the paddle at the end of the cantilever, with or without actively controlled vibration
(II) nano-analysis,
(III) replacing standard cantilevers in existing microscopes, or
(IV) simultaneously acquiring the topography and measuring the tip-sample interactions of a sample.

* * * * *